US012369011B2

(12) United States Patent
Raghu et al.

(10) Patent No.: US 12,369,011 B2
(45) Date of Patent: Jul. 22, 2025

(54) LOCATION IDENTIFICATION OF ACCESS POINTS IN A NETWORK

(71) Applicant: Hewlett Packard Enterprise Development LP, Houston, TX (US)

(72) Inventors: Vikram Raghu, San Jose, CA (US); Eldad Perahia, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 374 days.

(21) Appl. No.: 17/662,369

(22) Filed: May 6, 2022

(65) Prior Publication Data
US 2023/0362587 A1 Nov. 9, 2023

(51) Int. Cl.
| | |
|---|---|
| *H04W 4/029* | (2018.01) |
| *G06F 18/2137* | (2023.01) |
| *G06F 18/22* | (2023.01) |
| *H04W 4/02* | (2018.01) |
| *H04W 4/33* | (2018.01) |
| *H04W 88/08* | (2009.01) |

(52) U.S. Cl.
CPC ........ *H04W 4/029* (2018.02); *G06F 18/2137* (2023.01); *G06F 18/22* (2023.01); *H04W 4/023* (2013.01); *H04W 4/33* (2018.02); *H04W 88/08* (2013.01)

(58) Field of Classification Search
CPC ....... H04W 4/029; H04W 4/023; H04W 4/33; H04W 88/08; H04W 16/18; G06F 18/2137; G06F 18/22
See application file for complete search history.

(56) References Cited

U.S. PATENT DOCUMENTS

| | | |
|---|---|---|
| 7,340,455 B2 | 3/2008 | Platt et al. |
| 7,457,860 B2 | 11/2008 | Shang et al. |
| 7,812,718 B1 | 10/2010 | Chan et al. |
| 8,645,440 B2 | 2/2014 | Rosman et al. |
| 9,563,771 B2 | 2/2017 | Lang et al. |
| 9,853,997 B2 | 12/2017 | Canzanese, Jr. et al. |

(Continued)

OTHER PUBLICATIONS

NCSS, LCC., "Multidimensional Scaling," Chapter 435, available online at <https://www.ncss.com/wp-content/themes/ncss/pdf/Procedures/NCSS/Multidimensional_Scaling.pdf>, NCSS Statistical Software, pp. 435-1 to 435-17.

*Primary Examiner* — Santiago Garcia
(74) *Attorney, Agent, or Firm* — Hewlett Packard Enterprise Patent Department

(57) ABSTRACT

Examples of location determination of access points in a network are disclosed. In an example, a provisional proximity matrix comprising a measured distance between each pair of Access Points (APs) of a plurality of APs in a network is generated. Missing distances between one or more pairs of APs in the provisional proximity matrix are filled to generate a complete proximity matrix. A provisional deployment location map is generated for the plurality of APs based on the complete proximity matrix. Relative angles between paths connecting each pair of APs of the plurality of APs in the provisional deployment location map is determined. The filled distances in the complete proximity matrix are revised based on the relative angles to generate a corrected proximity matrix. A complete deployment location map for the plurality of APs is generated based on the corrected proximity matrix.

20 Claims, 12 Drawing Sheets

(56) References Cited

U.S. PATENT DOCUMENTS

| | | | |
|---|---|---|---|
| 10,306,405 B2* | 5/2019 | Persson | H04W 4/023 |
| 11,363,414 B2* | 6/2022 | Cho | G01S 5/02528 |
| 2010/0332465 A1 | 12/2010 | Janssens et al. | |
| 2014/0266916 A1* | 9/2014 | Pakzad | G01S 5/14 |
| | | | 342/464 |
| 2015/0334726 A1* | 11/2015 | Gao | H04B 7/0617 |
| | | | 370/330 |
| 2015/0372729 A1* | 12/2015 | Tajima | H04B 7/0478 |
| | | | 375/267 |
| 2015/0382143 A1* | 12/2015 | Lindskog | H04W 4/023 |
| | | | 455/456.1 |
| 2018/0035392 A1* | 2/2018 | Patel | H04W 52/367 |
| 2018/0054706 A1 | 2/2018 | Kastee et al. | |
| 2018/0084434 A1* | 3/2018 | Vuonnala | H04W 64/003 |
| 2018/0206075 A1* | 7/2018 | Demirdag | G01S 13/584 |
| 2018/0348998 A1 | 12/2018 | Mueller et al. | |
| 2019/0265367 A1* | 8/2019 | Silverman | G01S 5/04 |
| 2020/0068521 A1* | 2/2020 | Fang | H04J 3/0667 |
| 2020/0209378 A1* | 7/2020 | Yokev | H04W 84/12 |
| 2020/0233857 A1 | 7/2020 | Fehling et al. | |
| 2021/0028830 A1* | 1/2021 | Kim | H04W 52/281 |
| 2021/0058740 A1* | 2/2021 | He | G01S 3/20 |
| 2021/0321221 A1* | 10/2021 | Yerramalli | G01S 5/0278 |
| 2022/0196787 A1* | 6/2022 | Ayyalasomayajula | |
| | | | G01C 21/206 |
| 2023/0268964 A1* | 8/2023 | Hadani | H04W 16/18 |
| | | | 375/262 |
| 2024/0171802 A1* | 5/2024 | Qian | H04N 21/41265 |

* cited by examiner

LOCATION IDENTIFICATION OF ACCESS POINTS IN A NETWORK

BACKGROUND

Deployment of multiple access point (APs) in a facility is important to provide network access to wireless devices in the facility. Different locations where the APs are deployed plays a role in determining the coverage area of the network. Thus, placement of APs in the facility is planned based on different conditions, such ease of access, coverage area, density of clients in a particular area, etc. Further, the planned placement of the APs may also require modification as changes occur within the facility.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
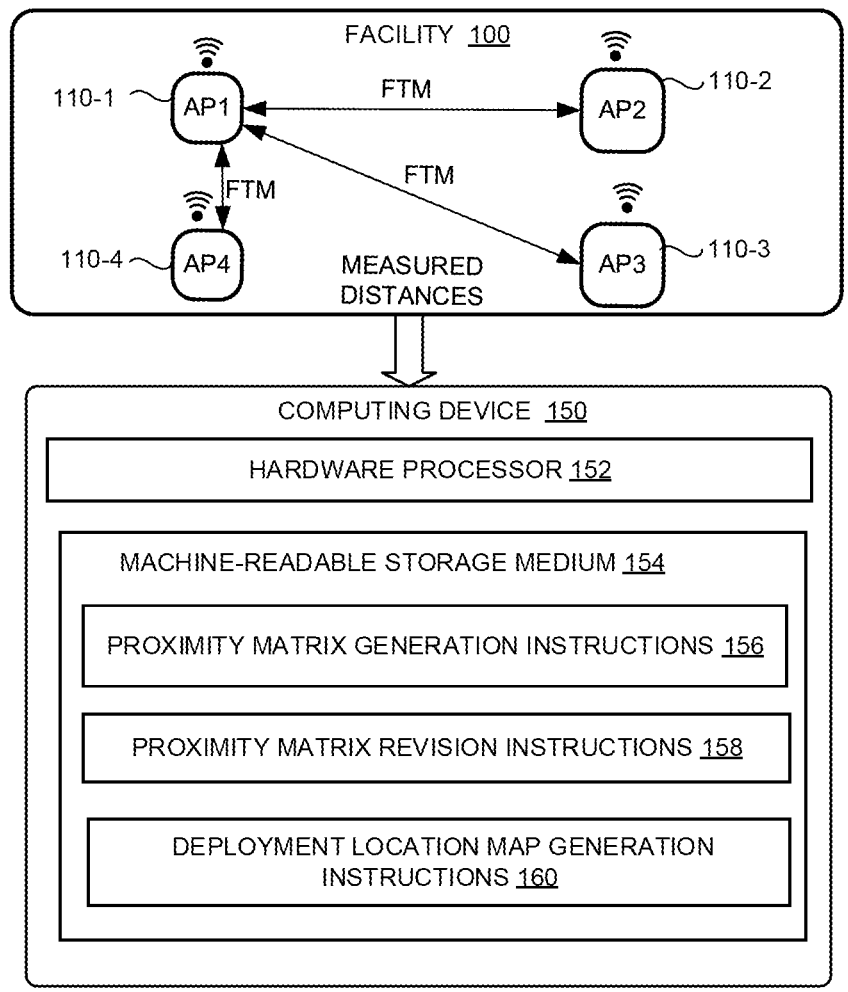
FIG. 1 illustrates location identification of APs within a facility, according to an embodiment of the present invention.

Once the APs are deployed in a particular location, later determining the precise location of each AP for servicing, maintenance, fault identification or replacement may be challenging. In some facilities, such as in an office building, the APs may be well hidden behind walls, decorative ceilings, and other structures. This may require the APs to be precisely located based upon information recorded at the time of deployment or through an electronic search process.

For example, the location of APs may be determined based on an AP map if such map was prepared at the time of initial deployment. However, generation of an AP map is labor-intensive, and the map may be inaccurate or out of date when the map is actually needed.

If a map of APs is unavailable or is unhelpful because of inaccuracy, then the determination of the location of APs may be performed by an electronic search process, such as by using a spectrum analyzer. A search for APs in this manner is time consuming and may not be helpful if an AP is subjected to a failure, or if a particular signal is difficult to track.

Further, generating and maintaining an accurate AP map (such as generated with a software tool for planning) may involve a manual process which may be labor-intensive. The manual process may generally include noting each AP location and marking the location on a floor map during or after AP installation. With such a manual process, there may remain a high probability of human error in documenting each AP location.

In addition, APs that are deployed in large installations may be displaced from their original intended location due to a variety of reasons, such as unfavorable mounting support for the AP, lack of equipment to reach a specific spot, a physical obstruction that was not marked in the floorplan, and many other reasons. In order for the AP map to be complete and up-to-date at all times, any changes to the installation site must be logged and the AP map updated promptly. If an AP map is not accurate, upgrading to new hardware or replacing faulty hardware may require many hours of labor and a great amount of cost to locate all the APs, which are often mounted in ceilings, placed behind drywall, or otherwise hidden from view. In certain installations, the operator may specifically wish to hide all AP installations and markings from view of facility customers, and thus there may be few visual clues as to the AP locations.

In some scenarios, automatic AP location techniques may be used to locate APs after deployment of APs is complete or a change in AP locations occur. Such automatic AP location techniques may generate a set of AP locations which may be utilized for any purpose relating to the APs. For example, the generated set of locations for the APs may be used to generate a map of the APs, or any other representation of the AP locations. The automatic generation of AP locations may be utilized to save the cost and manual effort required for carefully recording and modifying a map for AP deployment in a complex environment, or for discovering AP locations that are hidden within a building when there is a failure, an upgrade, or other issue requiring knowledge of the location of APs. Further, accurate AP placements are increasingly important as more customers implement indoor location services that are based on the AP operation, and knowledge of the location of the APs is necessary for accurate location services.

However, finding an AP location accurately with automatic AP location techniques may have some challenges. Automatic AP location techniques are generally based on Multi-Dimensional Scaling (MDS). For MDS to operate, a proximity matrix of distances between each pair of APs in a deployment is required as an input. For operation of MDS, the proximity matrix shall have no missing distances between a pair of APs. Further, the accuracy of a deployment location map for the APs outputted by the MDS is dependent on the accuracy of the distances mentioned in the proximity matrix.

The distances between each pair of APs in the deployment is generally measured by implementing Fine-timing measurement (FTM) protocol defined in Institute of Electrical and Electronics Engineers 802.11 (Wi-Fi) standard. FTM works by calculating the round-trip time (RTT) of a packet transmitted and later received by one of the devices. Although FTM has capabilities to provide a high degree of accuracy in measuring distances between two APs, the measurements are subject to transmit power limitations of an AP as all Wi-Fi packets. Thus, an AP cannot provide distance information to APs beyond its range of transmit/receive capabilities. Apart from this, there may be interference, physical obstacles, such as walls, fixed structures, etc. that may prevent a successful FTM exchange between APs even within range. This may result in generating an incomplete proximity matrix built based on FTM exchanges between APs. That is, the proximity matrix generated based on FTM exchange between APs in a facility may have missing distances between one or more pairs of APs in the facility.

However, for MDS to function this incomplete proximity matrix needs to be completed by filling the missing distances. In some cases, the missing distances may be filled by estimating the distances based on Dijkstra's shortest path algorithm. According to the Dijkstra's shortest path algorithm, if a distance value between a pair of APs in the proximity matrix is missing, it may be filled by a value that represents a shortest path between the pair of APs. However, on applying MDS on a proximity matrix completed using the Dijkstra's shortest path algorithm, the resulting deployment location map may be stretched due to error introduced by Dijkstra's shortest path algorithm. The error may cause a calculated distance between a pair of APs to be greater than the actual distance between them which may cause the deployment location map to be stretched and hence inaccurate. Such inaccuracies in the deployment location map may introduce challenges in precisely locating APs in the facility.

The present invention provides for generation of a deployment location map of APs in a facility with high of accuracy. In an example, a provisional proximity matrix may be generated where the provisional proximity matrix comprises a measured distance between each pair of APs of a plurality of APs in a network. Missing distances between a pairs of APs from the plurality in the provisional proximity matrix may be filled to generate a complete proximity matrix. Based on the complete proximity matrix, a provisional deployment location map may be generated for the plurality of APs. Relative angles between paths connecting the pair of APs and another AP from the plurality in the provisional deployment location map may be determined. The filled distances in the complete proximity matrix may be revised based on the relative angles to generate a corrected proximity matrix. A complete deployment location map for the plurality of APs may be generated based on the corrected proximity matrix. The complete deployment location map may be a true representation of location of the APs in the plurality. Errors which may be introduced in the complete proximity matrix while filling the missing values may be minimized by use of the corrected proximity matrix. Consequently, the resulting complete deployment location map may accurately identify locations of the APs in the facility.

The following detailed description refers to the accompanying drawings. Wherever possible, the same reference numbers are used in the drawings and the following description to refer to the same or similar parts. While several embodiments of the present invention are described herein, modifications, adaptations, and other implementations of those embodiments are possible. Accordingly, the following detailed description does not limit the scope of the present invention. Instead, the proper scope of the present invention is defined by the appended claims.

FIG. 1 is an illustration of location identification of multiple APs within a facility, according to an embodiment of the present invention. As illustrated in FIG. 1, a particular facility 100 includes a plurality of APs, AP1 110-1, AP2 110-2, AP3 110-3, and AP4 110-4, that are scattered throughout the facility 100 to provide wireless communication coverage. In some examples, an apparatus, system, or process is to locate each AP in either two dimensions or three dimensions through a combination of measurements of distances between each pair of APs of the plurality of APs, and locating APs based on the measured distances.

An AP, as used herein, is an example of a point of access to a network. The AP may control network access of client devices and may authenticate the client devices for connecting to the APs and through the APs, to other devices within the network. The AP may be a combination of hardware, software, and/or firmware that is configured to provide wireless network connectivity to wireless client devices. The AP may communicate with the network over connections, which may be wired or wireless interfaces.

In an example, a computing device 150, may communicate with the plurality of APs, AP1 to AP4. Examples of the computing device 150 include a server, laptop computer, or other device including computing capabilities. Although FIG. 1 shows the computing device 150 outside the facility 100, in some examples, the computing device 150 may be inside the facility 100. In the example of FIG. 1, the computing device 150 includes a hardware processor 152 and a machine-readable storage medium 154. The hardware processors 152 may be one or more central processing units (CPUs), semiconductor-based microprocessors, and/or other hardware devices suitable for retrieval and execution of instructions stored in the machine-readable storage media 154. The hardware processor 152 may fetch, decode, and execute instructions, such as instructions, for locating an AP in the facility 100.

In some examples, machine-readable storage media 154 may be a non-transitory storage medium, where the term "non-transitory" does not encompass transitory propagating signals. As described in detail below, machine-readable storage medium 154 may be encoded with executable instructions for locating an AP in the facility 100. The instructions include proximity matrix generation instructions 156, proximity matrix revision instructions 158, and deployment location map generation instructions 160.

The computing device 150 may send one or more than one request to the plurality of APs to determine a measured distance between each pair of APs of the plurality. In response to receiving the request from the computing device 150, the APs may determine the measured distance between each pair of APs. The APs may, for example, determine the measured distance using AP signaling, such as using measurement of RTT of signals between the APs to determine the distance between each pair of APs. The determination of the measured distance may include the use of FTM between each pair of APs. FTM is a feature provided in IEEE 802.11 me for determination of distances between stations utilizing time of flight of frame exchange between a sending station and a receiving station. FTM may be utilized to provide measurement of distances based on direct signal transmissions (i.e., line-of-sight in terms of signal transmission) between each pair of APs in a facility. In some examples, the determination of the measured distance may be performed based on received signal strength.

In an example, the result of the measured distance between each pair of APs is a set of data describing measured distances between all APs, such as AP1 to AP4 of FIG. 1. The APs may send the measured distance between each pair of APs to the computing device 150. The hardware processor 152 may execute proximity matrix generation instructions 156 stored in the machine-readable storage medium 154 to generate a table to represent the set of data (such as the table shown in FIG. 3B). The table may be referred to as a proximity matrix. The proximity matrix is a representation, such as in the form of a two-dimensional array, of pairwise distances between the plurality of APs, such as AP1 through AP4 of FIG. 1.

This proximity matrix may include missing distances between one or more pair of APs in the plurality. Missing distances may result from pairs of APs that are not within direct signal transmission of each other, such as in circumstances in which a structure or transmitter blocks or interferes with the signal between a sending AP and a receiving AP. This proximity matrix with missing distances is referred to as a provisional proximity matrix.

Figures 3A, 3B, 3C:
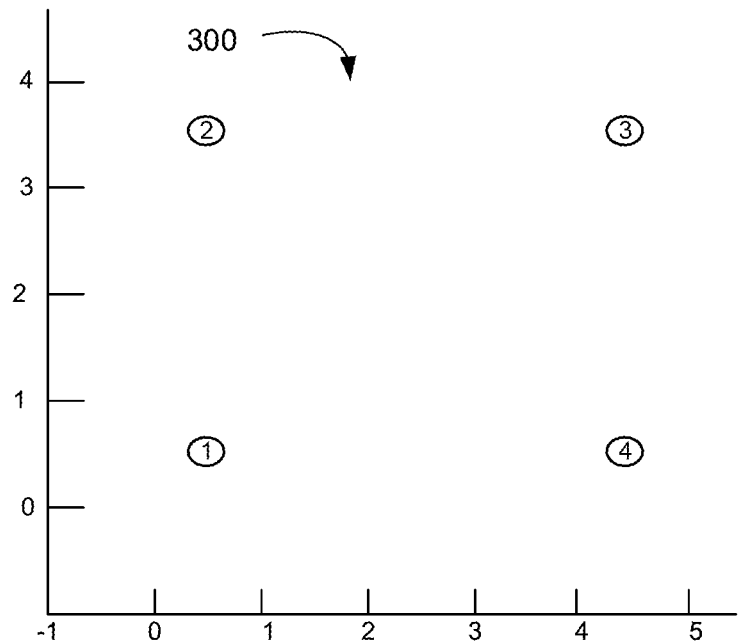
FIG. 3A illustrates an example map of actual locations of APs in a deployment.
FIG. 3B illustrates an example provisional proximity matrix generated in performing location identification of APs, according to an embodiment of the present invention.
FIG. 3C illustrates an example complete proximity matrix generated from a provisional proximity matrix in performing location identification of APs, according to an embodiment of the present invention.

The hardware processor 152 may execute proximity matrix generation instructions 156 stored in the machine-readable storage medium 154 to fill a missing distance between a pairs of APs in the provisional proximity matrix. In an example, the computing device 150 may estimate a value for the missing distance in the provisional proximity matrix. In some examples, the missing distance in a provisional proximity matrix may be filled using a "best-guess" value for the distance. For example, a "best guess" distance value may be generated by applying Dijkstra's shortest path algorithm to the provisional proximity matrix. In an example, multiple missing distances between different pairs of APs may be filled using Dijkstra's shortest path algorithm. On filling the missing distances in the provisional proximity matrix a complete proximity matrix may be generated, such as illustrated in FIG. 3C.

The hardware processor 152 may execute deployment location map generation instructions 160 stored in the machine-readable storage medium 154 to generate a provisional deployment location map for the plurality of APs based on the complete proximity matrix. In an example, the complete proximity matrix is solved to determine a location of each AP in relation to each of the other APs to generate the provisional deployment location map. The provisional deployment location map refers to a map of locations of the plurality of APs generated from the complete proximity matrix. In an example, the computing device 150 may implement MDS to obtain location of APs from the complete proximity matrix. MDS may be applied on the complete proximity matrix to generate a set of locations representing the relative positions of number of objects based upon a table of the distances between them. In an example, the set of locations may be provided as a two-dimensional (2D) or three-dimensional (3D) mapping based on the complete proximity matrix. Thus, MDS translates information about pairwise distances among the plurality of APs in the complete proximity matrix into a configuration of the APs mapped into cartesian space, also called the provisional deployment location map, such as illustrated in the map of APs in FIG. 4.

Figure 5:
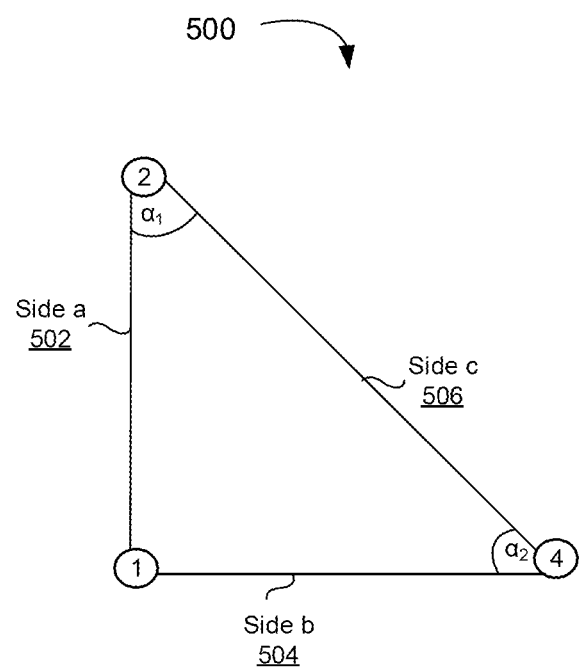
FIG. 5 illustrates an example geometric shape outlined from a provisional deployment location map in performing location identification of APs, according to an embodiment of the present invention.

The hardware processor 152 may execute proximity matrix revision instructions 158 stored in the machine-readable storage medium 154 to determine relative angles between paths connecting the pair of APs with another AP of the plurality of APs in the provisional deployment location map. The pair of APs are those APs between which a missing distance has been filled. In an example, the paths connecting the pair of APs in the provisional deployment location map are straight lines. In an example, the relative angles may be determined as illustrated in FIG. 5.

The hardware processor 152 may execute proximity matrix revision instructions 158 stored in the machine-readable storage medium 154 to revise a filled distance in the complete proximity matrix based on the relative angles to generate a corrected proximity matrix. Revising the filled distance includes estimating the filled distance as a function of the relative angles and paths connecting the pair of APs with the other AP. As a result of revision of the filled distance, the error introduced in the filled distance may be reduced/eliminated and consequently a corrected distance between each pair of APs may be represented in the corrected proximity matrix.

The hardware processor 152 may execute deployment location map generation instructions 160 stored in the machine-readable storage medium 154 to generate a complete deployment location map for the plurality of APs based on the corrected proximity matrix. In an example, the complete deployment location map includes a set of locations of the plurality of APs plotted in cartesian space. In an example, the computing device 150 may implement MDS to obtain location of APs from the corrected proximity matrix. In an example, the set of locations may be provided as 2D mapping based on the corrected proximity matrix. Thus, MDS translates information about pairwise distances among the plurality of APs in the corrected proximity matrix into a configuration of the APs mapped into cartesian space, also called the complete deployment location map, such as illustrated in the map of APs in FIG. 7. Since the complete deployment location map is based on the corrected proximity matrix, the set of locations of the plurality of APs may be precisely identified in the complete deployment location map.

Figure 2A:
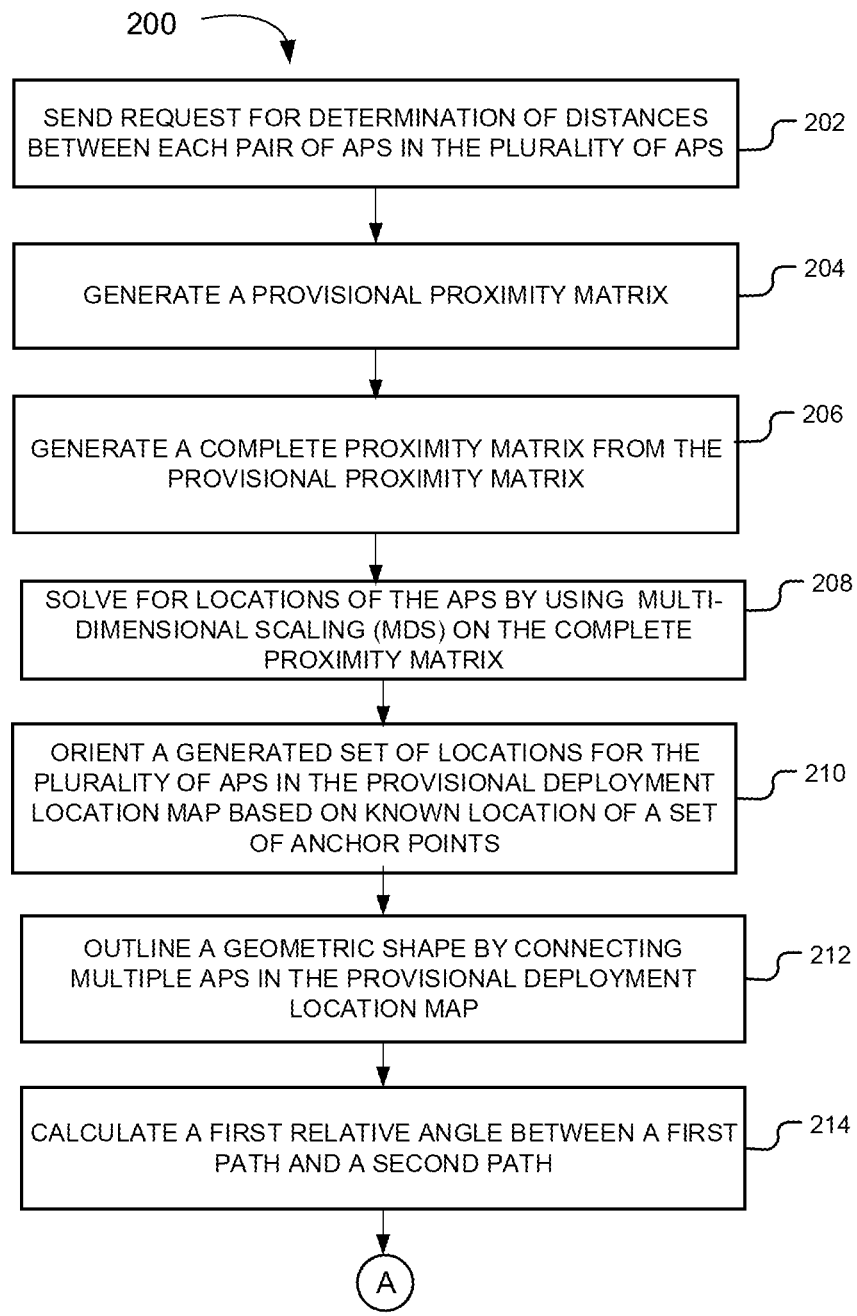
FIGS. 2A and 2B is a flowchart to illustrate an example method for location identification of APs in a facility, according to an embodiment of the present invention.
Figure 2B:
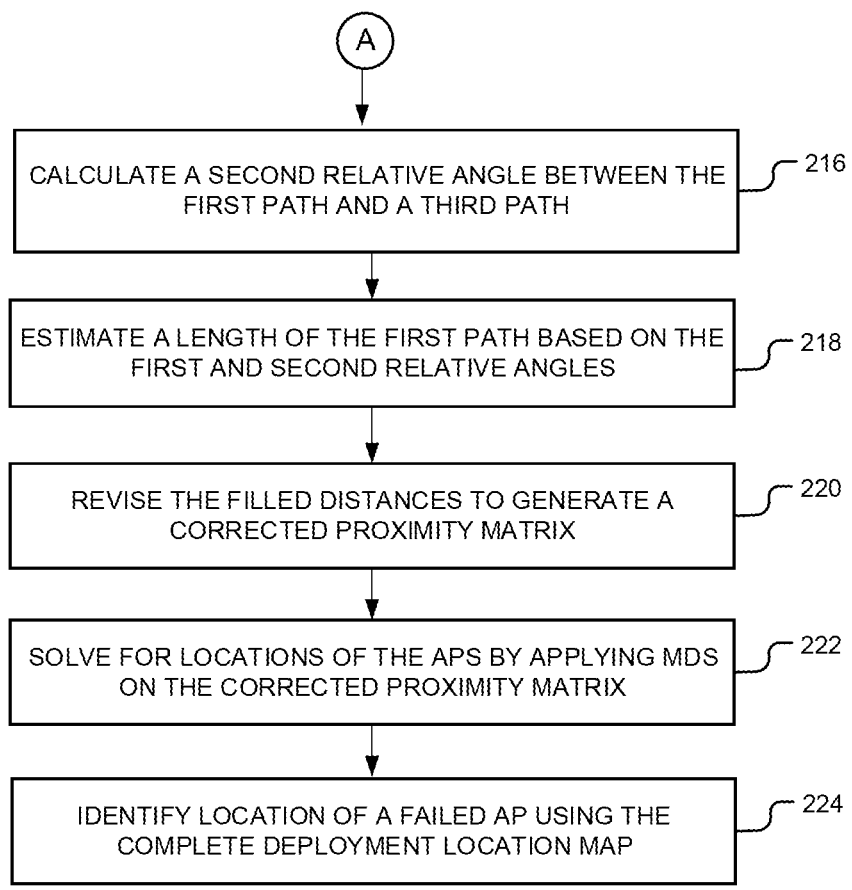

FIG. 2 is a flowchart to illustrate a method 200 for location identification of a plurality of APs in a facility, according to an embodiment of the present invention. The plurality of APs may be deployed in a particular facility, such as facility 100 of FIG. 1. The facility may be any building or complex, and there may be any number of APs within the plurality. In an example, the steps of the method 200 may be performed by a computing device, such as the computing device 150 of FIG. 1.

At block 202, a request is sent for determination of a distance between each pair of APs in the plurality of APs. In an example, the computing device may send the request to each of the plurality of APs. In an example, the determination of distances may include measurement of distances between each pair of APs through signal transmission between each pair of APs using FTM to determine line of sight distances. As a result, a measured distance between each pair of APs may be obtained. The plurality of APs may send the measured distances to the computing device. In some examples, the measured distances may be calculated using received signal strength.

At block 204, a provisional proximity matrix may be generated. In an example, the computing device may generate the provisional proximity matrix by populating the measured distances between each pair of APs in a tabular representation, such as in the form of a two-dimensional array, of pairwise distances between the plurality of APs.

The tabular representation of pairwise distances between the plurality of APs is also referred to as the provisional proximity matrix. In some examples, the provisional proximity matrix may include missing distances between one or more pair of APs in the plurality. Missing distances may result from pairs of APs that are not within direct signal transmission of each other, such as in circumstances in which a structure or transmitter blocks or interferes with the signal between a sending AP and a receiving AP. In an example, if the receiving AP does not receive signals from the sending AP, the entry corresponding to the distance between the sending AP and the receiving AP is left as a blank field in the provisional proximity matrix. Such blank fields in the provisional proximity matrix are referred to as missing distances. Thus, the missing distances are blanks or voids in the provisional proximity matrix. A missing distance between a pair of APs in the provisional proximity matrix indicates that a measured distance cannot be obtained between the pair of APs. In some examples, the provisional proximity matrix may also include incorrect measured distances. The incorrect measured distances may result due to an error in FTM measurements or received signal strength measurements based on which the measured distance is calculated.

At block 206, a complete proximity matrix may be generated from the provisional proximity matrix. In an example, the computing device may run Dijkstra's shortest path algorithm on all non-diagonal elements of the provisional proximity matrix to generate the complete proximity matrix. In an example, for each pair of APs in the provisional proximity matrix, the algorithm may search for an alternate path between the pair that results in the lowest non-zero distance value between them. The lowest non-zero distance value between the pair of APs calculated by using Dijkstra's shortest path algorithm is also called a Dijkstra's distance. Thus, Dijkstra's distances between each pair of APs in the provisional proximity matrix is determined. In an example, the computing device may replace the missing distances in the provisional proximity matrix with the Dijkstra's distances. Thus, the blanks (missing distances) in the provisional proximity matrix may be filled to generate the complete proximity matrix. Further, since Dijkstra's shortest path algorithm is executed on all non-diagonal elements of the provisional proximity matrix, measured distances greater than the Dijkstra's distances may be replaced by the Dijkstra's distances in the complete proximity matrix. Thus, incorrect measured distances which are greater than the actual distance between a pair of APs may also get replaced by the Dijkstra's distances which may allow to reduce errors in distance values in the complete proximity matrix.

At block 208, locations of the APs may be solved by using MDS on the complete proximity matrix. In an example, the computing device may provide the complete proximity matrix as an input to MDS. The output of the MDS provides locations of the APs in relation to each other. MDS translates information about pairwise distances among the plurality of APs in the complete proximity matrix into a configuration of the APs mapped into cartesian space, also called the provisional deployment location map. Each node in the provisional deployment location map may represent the location of an AP in the deployment.

While the set of locations in the provisional AP deployment map provides the relationship of the locations all APs, this may not resolve the rotation and inversion of the locations in 3D (or 2D) space, i.e., the set of locations may be oriented in any direction, or may be inverted, while satisfying the AP distance values. In some examples, the rotation and inversion of the set of locations is resolved, by computing device, using one or more actual known locations of APs. Such known APs may be referred to as a set of anchor points. Generally, the set of anchor points includes at least three anchor points to resolve the mapping of the proximity matrix in 3D/2D space. However, the actual number of anchor points required may depend on the particular circumstances. Thus, at block 210, a generated set of locations of the APs in the provisional deployment location map may be oriented based on known location of the set of anchor points. In some examples, the computing device may determine location of the anchor points by use of Global Positioning System (GPS) data to provide the needed coordinates. In some examples, solving of the complete proximity matrix, including the necessary number of known anchor points, results in generation of a properly oriented set of locations of the APs in the provisional deployment location map.

At block 212, a geometric shape, may be outlined by connecting multiple APs in the provisional deployment location map. In an example, the computing device may select the multiple APs to outline the geometric shape, such that the multiple APs include a pair of APs between which a missing distance was filled. The pair of APs between which the missing distance was filled is also referred to as a filed distance AP pair. In an example, the geometric shape may be obtained by connecting the filed distance AP pair with another AP in the provisional deployment location map. A path connecting the two APs in the filled distance AP pair with each other is referred to as a first path. The first path may have a first end also called a first node and a second end also called a second node. The first node represents a location of one AP of the filled distance AP pair and the second node represents a location of the other AP of the filled distance AP pair. The geometric shape may include a third node. The third node represents a location of the other AP from the plurality with which the filled distance AP pair is connected to outline the geometric shape. The computing device may select the third node such that a distance between the first node and the third node and a distance between the second node and the third node are measured distances, such as measured distances using FTM or signal strength measurements between the APs.

The geometric shape may include a second path that connects the first node with the third node in the provisional deployment location map. Thus, a length of the second path is a measured distance obtained using FTM or signal strength measurements. In an example, the length of the second path may be obtained from the provisional proximity matrix. The geometric shape may include a third path that connects the second node with the third node in the provisional deployment location map. Thus, a length of the third path is a measured distance obtained using FTM or signal strength measurements. In an example, the length of the third path may be obtained from the provisional proximity matrix. In an example, the geometric shape may be a triangle, such as triangle 500 shown in FIG. 5. The first path, second path, and the third path may form the sides of the triangle. In another example, the computing device may also outline a pattern by connecting the multiple APs. The pattern may have at least one path connecting the filled distance AP pair. In some examples, the pattern may be a combination of multiple regular or irregular geometric shapes.

At block 214, a first relative angle between the first path and the second path may be calculated. The first relative angle refers to an angle formed at the first node of the provisional deployment location map where the first path and the second path meet. In an example, the first relative angle is inside the geometric shape outlined at step 212. In an example, the computing device may determine the first relative angle from the outline of the geometric shape and based on the output of the MDS performed on the complete proximity matrix at step 208.

At block 216, a second relative angle between the first path and the third path may be calculated. The second relative angle refers to an angle formed at the second node of the provisional deployment location map where the first path and the third path meet. In an example, the second relative angle is inside the geometric shape outlined at step 212. In an example, the computing device may determine the second relative angle from the outline of the geometric shape and based on the output of the MDS performed on the complete proximity matrix at step 208. Further, from the complete proximity matrix input to MDS, the computing device is aware of the lengths of the second path and the third path determined based on FTM measurements or signal strength measurements between APs, as mentioned earlier.

At block 218, a length of the first path may be estimated using equation (1) outlined below.

$$c = a \cos \alpha_1 + b \cos \alpha_2 \quad (1)$$

In the above equation 1, "c" refers to a length of the first path, "a" refers to a length of the second path, "b" refers to a length of the third path, "$\alpha_1$" refers to the first relative angle, and "$\alpha_2$" refers to the second relative angle. Thus, the computing device estimates a length of the first path based on the first and second relative angles. Further, although the foregoing description is in relation to a geometric shape, the computing device may outline geometric patterns and, in some examples, obtain the distance as a sum of cosines of relative angles. In an example, the geometric patterns may also be formed by a combination of regular or irregular geometric shapes. In some examples, the geometric patterns may be subdivided into fragments of patterns or geometric shapes to obtain the distance as a sum of cosines of relative angles.

At block 220, the filled distance between the filled distance AP pair may be revised based on the estimation. Thus, the computing device may update the distance between the filled distance AP pair in the completed proximity matrix with the estimated distance between them obtained from block 218. In some examples, the filled distances between multiple such filled distance AP pairs may be revised based on similar estimations. After revising multiple filled distances in the complete proximity matrix a corrected proximity matrix may be generated.

At block 222, locations of the plurality of APs may be solved by applying MDS on the corrected proximity matrix. In an example, the computing device may provide the corrected proximity matrix as an input to an MDS algorithm. The solution of the corrected proximity matrix provides location of the APs in relation to each other. MDS translates information about pairwise distances among the plurality of APs in the corrected proximity matrix into a configuration of the APs mapped into cartesian space, also called the complete deployment location map. In the complete deployment location map each node represents location of an AP.

Further, at block 224, the location of a failed AP from the plurality of APs may be identified using the complete deployment location map. Say, an AP from the plurality is subjected to a failure. In such a scenario, the distance between the failed AP and any of the other APs may be missing in the provisional proximity matrix as the failed AP may not be able to transmit/receive FTM signals. However, using the method 200 as described above, the computing device may generate the complete deployment location map. Based on an analysis of the provisional proximity matrix, the complete proximity matrix, and the complete deployment location map, the computing device may identify a location of the failed AP.

FIG. 3A illustrates an example map 300 of actual locations of APs in a deployment, such as the facility 100 of FIG. 1. The map 300 of FIG. 3A shows 4 APs, viz., AP1 to AP4. The map 300 may be obtained by a manual process of locating the APs during installation. In an example, the manual process may include noting each AP location and marking the location on a floor map during or after AP installation. The map 300 is illustrated to provide a point of reference with regard to the actual locations of the APs. In the map 300, the x and y co-ordinates are in meters. Node 1 represents location of AP1, node 2 represents location of AP2, and so on. As can be seen from FIG. 3A, a distance between AP1 and AP2 is 3 meters, a distance between AP2 and AP3 is 4 meters, a distance between AP3 and AP1 is 5 meters, and a distance between AP4 and AP2 is 5 meters.

FIG. 3B illustrates an example provisional proximity matrix 302 generated in performing location identification of APs, according to an embodiment of the present invention. The provisional proximity matrix 302 of FIG. 3B includes missing distances and incorrect measured distances. The provisional proximity matrix 302 includes pairwise measured distances between four APs, viz., AP1 to AP4. In an example, the provisional proximity matrix 302 may be generated by performing FTM measurements between AP1 through AP4 in facility 100 of FIG. 1. As can be seen from the provisional proximity matrix 302, the measured distance between AP1 and AP2 is 3 meters, the measured distance between AP2 and AP3 is 4 meters, and so on. The distance between AP2 and AP4 is a missing distance, because no distance measurement could be obtained between AP2 and AP4. As illustrated in FIG. 1, these pairs of APs, i.e., AP2 and AP4, are at a significant distance from each other, and may be unable to provide direct, line of sight signaling because of obstruction or interference. The missing distance between AP2 to AP4 is denoted by "x", in bold, in the provisional proximity matrix 302. Further, the distance between AP1 and AP3 is an incorrect measured distance. As may be understood from the map 300 of FIG. 3A, the actual distance between AP1 and AP3 is 5 meters, whereas, the measured distance between AP1 and AP3 as populated in the provisional proximity matrix 302 is "11" indicated in bold in FIG. 3B. This large difference between actual distance and measured distance may arise because of a large measurement error caused due to various circumstances, such as blocking of FTM signal due to interference, interoperability issues between the APs, incorrect listing of neighbour APs, etc.

FIG. 3C illustrates an example complete proximity matrix 304 generated from a provisional proximity matrix in performing location identification of APs, according to an embodiment of the present invention. In an example, the complete proximity matrix 304 may be obtained by running Dijkstra's shortest path algorithm on all non-diagonal elements of the provisional proximity matrix 302 of FIG. 3B. By running Dijkstra's shortest path algorithm, the computing device may determine that for AP1 and AP3 adding the paths from AP1 to AP2 and AP2 to AP3 may result in a total of 7 which is the lowest non-zero value. Similarly, for AP2 to AP4 the computing device may determine that adding the paths from AP2 to AP3 and AP3 to AP4 result in the lowest non-zero value of 7. Thus, by running Dijkstra's shortest path algorithm on the provisional proximity matrix 302 of FIG. 3B, the incorrect measured distance "11" between AP1 and AP3 may be replaced by "7" and the missing distance between AP2 and AP4 may be filled by "7". As a result, the complete proximity matrix 304 may be generated.

Figure 4:
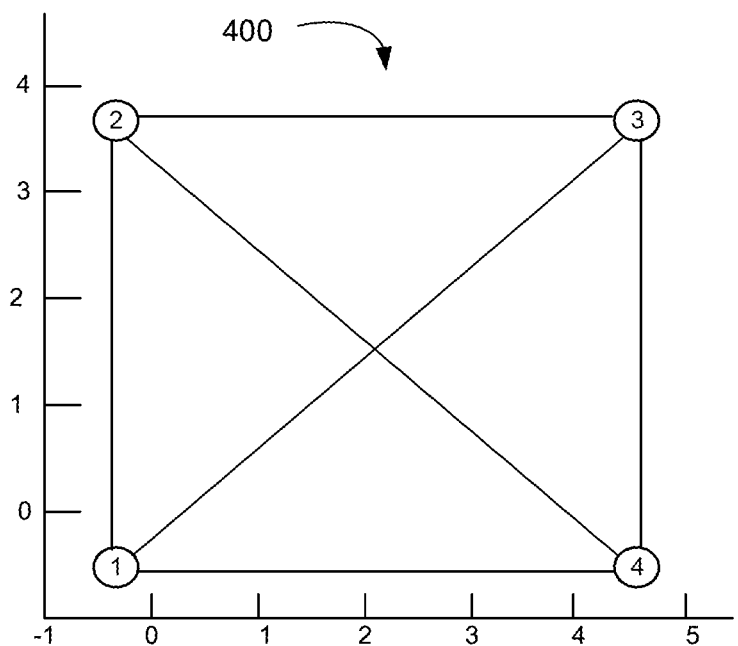
FIG. 4 illustrates an example provisional deployment location map generated from a complete proximity matrix in performing location identification of APs, according to an embodiment of the present invention.

FIG. 4 illustrates an example provisional deployment location map 400 generated from a complete proximity matrix in performing location identification of APs, according to an embodiment of the present invention. In an example, the provisional deployment location map 400 may be obtained by applying MDS on the complete proximity matrix 304 of FIG. 3C. In the provisional deployment location map 400, each node represents location of an AP. Thus, node 1 represents location of AP1, node 2 represents location of AP2, and so on. It may be noted that the provisional deployment location map 400 forms a geometric shape which resembles the geometric shape of the map 300 of actual locations of the APs, as can be seen by a comparison with FIG. 3A. The geometric shape still remains a rectangle identical to the shape in which the APs, AP1 to AP4, are distributed in the map 300 of actual locations of APs. However, the provisional deployment location map 400 is a stretched version of the map 300 of actual location of the APs. Although, in this example the provisional deployment location map 400 is illustrated with four APs for ease of explanation, this behavior may also be seen when scaled to a larger number of APs. The stretching of the provisional deployment location map 400 may be due to positive error which may have been introduced by the Dijkstra's shortest path algorithm when filling in the missing distances.

FIG. 5 illustrates an example geometric shape 500 outlined from a provisional deployment location map in performing location identification of APs, according to an embodiment of the present invention. In an example, the geometric shape 500 may be outlined by connecting multiple APs in the provisional deployment location map 400. In the example of FIG. 5, the multiple APs include a pair of APs, viz., AP2 and AP4 between which a missing distance was filled by Dijkstra's distance. In another example, the multiple APs may include a pair of APs where an incorrect measured distance between the pair of APs was filled by Dijkstra's distance. The geometric shape 500 is a triangle with side a 502, side b 504, and side c 506. Side c 506 represents the first path connecting the pair of APs, AP2 and AP4, for which a missing distance was filled by the Dijkstra's distance to obtain a complete proximity matrix. Side a 502 represents a second path connecting AP1 and AP2 and side b 504 represents a third path connecting AP1 and AP4. It may be noted that lengths of the second path and the third path may be obtained from the measured distances in the provisional proximity matrix, such as the provisional proximity matrix 302 of FIG. 3B. The measured distances in the provisional proximity matrix may be obtained through FTM measurements or signal strength measurements. The computing device calculates the first relative angle $\alpha_1$ between the first path, side c 506 (AP2-AP4) and the second path, side a 502 (AP1-AP2). Further, the computing device calculates the second relative angle $\alpha_2$ between the first path, side c 506 (AP2-AP4) and the third path side b 504 (AP1-AP4).

Further, from the complete proximity matrix 304 of FIG. 3C input to MDS, the computing device knows the lengths of the side a 502 and side b 504. Based on the complete proximity matrix 304, a length of side a 502 equals to 3 and length of side b 504 equals to 4. Based on the lengths of the side a 502 and side b 504 and the first relative angle $\alpha_1$ and the second relative angle $\alpha_2$, the computing device may estimate a length of the side c 506 using equation (1) mentioned above. Say, length of the first path side c 506 is denoted by L. Then from equation (1), L=(3) cos $\alpha_1$+(4) cos $\alpha_2$ Say, from the above L is estimated to be 5. Thus, the distance between AP2 and AP4 may be updated in the complete proximity matrix with the estimated value of L. Similarly, the distance between AP1 and AP3 may also be updated in the complete proximity matrix with an estimated value of their distance based on the relative angles. Say, the distance between AP1 and AP3 is also estimated to be 5. On revising the filled distances between AP1 and AP3 and AP2 and AP4 a corrected proximity matrix may be generated.

Figures 6, 7:
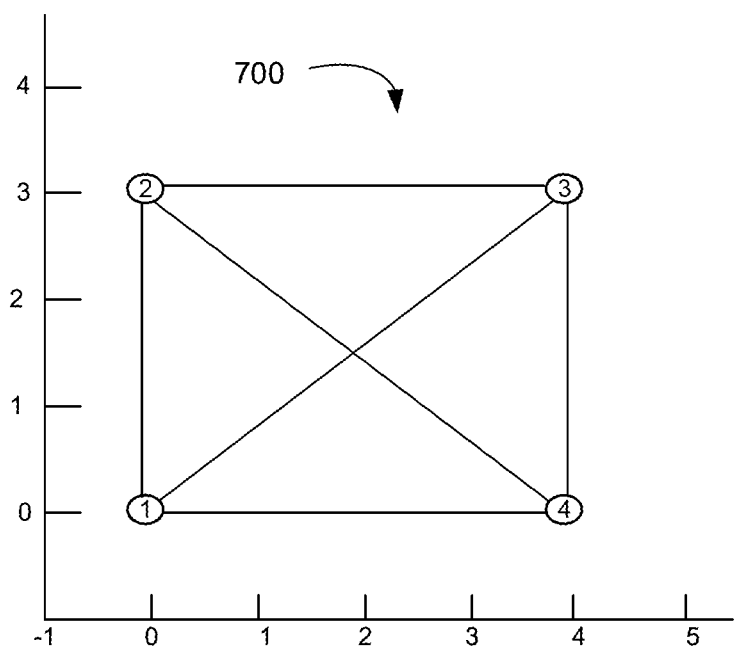
FIG. 6 illustrates an example corrected proximity matrix generated by revising the filled distances in a completed proximity matrix in performing location identification of APs, according to an embodiment of the present invention.
FIG. 7 illustrates a complete deployment location map generated by solving for locations of APs from a corrected proximity matrix in performing location identification of APs, according to an embodiment of the present invention.

FIG. 6 illustrates an example corrected proximity matrix 600 generated by revising the filled distances in a completed proximity matrix in performing location identification of APs, according to an embodiment of the present invention. In an example the corrected proximity matrix 600 may be generated by revising the filled distances in the completed proximity matrix 304 of FIG. 3C. As seen in FIG. 6, the distance between AP1 and AP3 is replaced by "5" and the distance between AP2 and AP4 is also replaced "5". As may be seen, the revised distance between AP1-AP3 and AP2-AP4 is closer to the actual distance between those pairs of APs than the filled distance in the complete proximity matrix. In fact, the revised distance matches with the actual distance between AP1-AP3 and AP2-AP4. Thus, the revision of the filled distances allows to obtain a more accurate distance between a pair of APs.

FIG. 7 illustrates a complete deployment location map 700 generated by solving for locations of APs by applying MDS on a corrected proximity matrix in performing location identification of APs, according to an embodiment of the present invention. In an example the complete deployment location map 700 may be generated by applying MDS on the corrected proximity matrix 600 of FIG. 6. In the complete deployment location map 700, node 1 represents location of AP1, node 2 represents location of AP2, and so on. As can be seen by a comparison of the provisional deployment location map 400 of FIG. 4 and the complete deployment location map 700 of FIG. 7, the provisional deployment location map is slightly stretched or elongated as compared to the complete deployment location map. Also, it may be seen that relative positions of APs, AP1 to AP4, in the complete deployment location map 700 is identical to the actual relative positions of the APs in the map 300 of the APs. Thus, the complete deployment location map 700 is a more accurate map of the location of the APs, AP1 to AP4.

Figure 8:
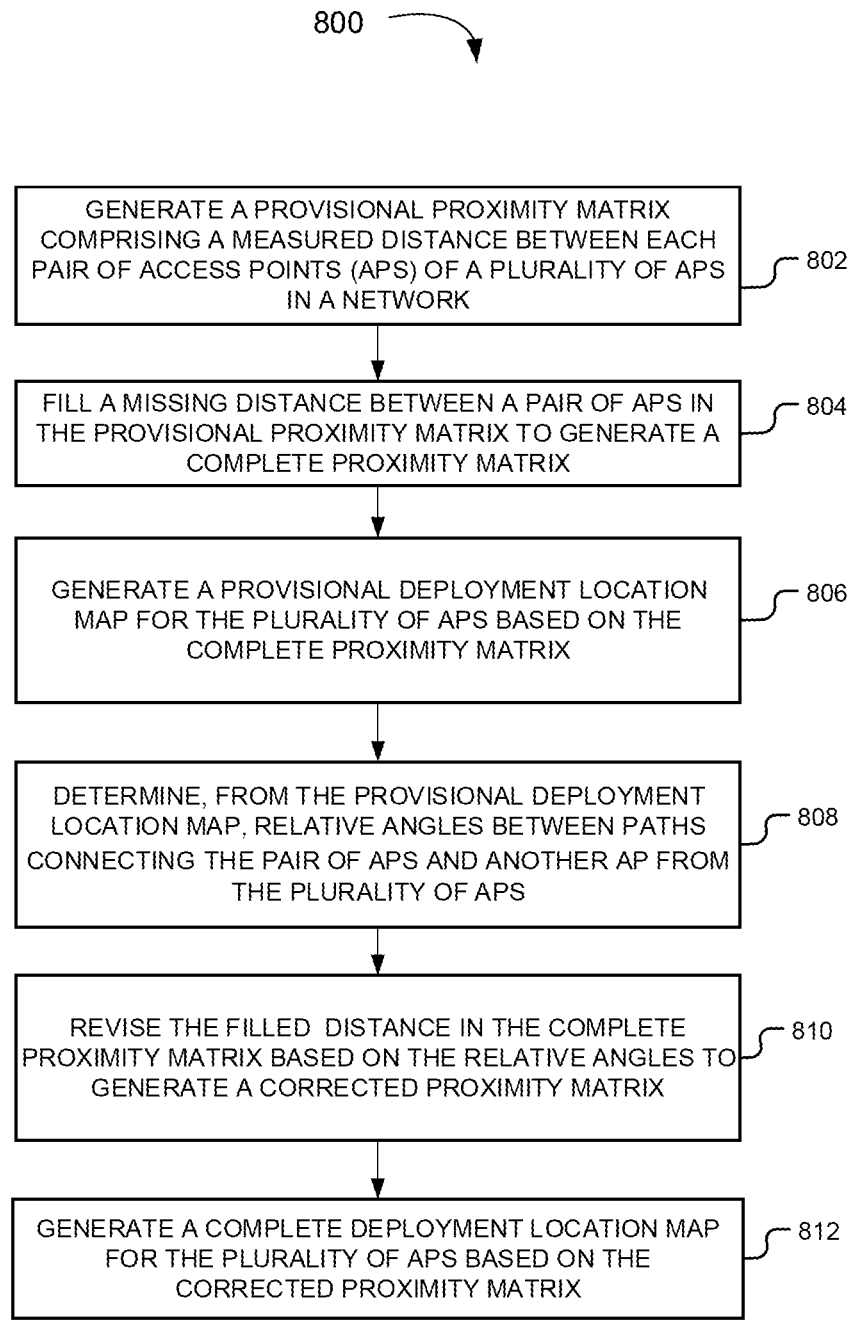
FIG. 8 illustrates a method for deployment location map generation of APs in a facility, according to an embodiment of the present invention.

FIG. 8 illustrates an example method 800 for deployment location map generation of APs in a facility, in accordance with an embodiment of the present invention. The steps of FIG. 8 may be executed by a computing device, such as computing device 150 of FIG. 1. The deployment location map may be a complete deployment location map, such as the map 700 shown in FIG. 7.

As used herein, an AP (also referred to as a wireless access point (WAP)) refers to a networking hardware device that allows devices to connect to a wired network, including connection to the Internet or an intranet. The AP may connect to a router (via a wired network) as a standalone device or may be an integral component of the router itself. An AP may include, but is not limited to, a Wi-Fi access point operating under operating under one or more IEEE 802.11 standards. An access point may also operate using any other wireless communication technology, including, for example, cellular communications (including 4G and 5G technology), Bluetooth, ZigBee, and other technologies.

Referring to FIG. 8, at block 802, the computing device may generate a provisional proximity matrix comprising a measured distance between each pair of APs of a plurality of APs in a network. In an example, the computing device may receive the measured distance between each pair of APs from the plurality of APs. The measured distance may be obtained by performing measurements of RTTs of signals sent between APs according to the FTM techniques. The computing device may populate the measured distances in the form of table referred to as the provisional proximity matrix.

At block 804, the computing device may fill a missing distance between a pair of APs in the provisional proximity matrix to generate a complete proximity matrix. In some examples, the provisional proximity matrix may include some blanks also called missing distances between one or more pairs of APs. The missing distances may result because signals between a pair of APs may not reach each other due to interference, loss of signal strength, etc. These missing distances may be filled by the computing device by running Dijkstra's shortest path algorithm on the provisional proximity matrix.

At block 806, the computing device may generate a provisional deployment location map for the plurality of APs based on the complete proximity matrix. In an example, the computing device may compute an MDS solution using the complete proximity matrix. The complete proximity matrix may be provided as an input to MDS to generate the provisional deployment location map. MDS may generate a map of location of APs based on pairwise distance of the APs in the complete proximity matrix.

At block 808, the computing device may determine relative angles between paths connecting the pair of APs and another AP from the plurality in the provisional deployment location map. In an example, the paths may include a path connecting the pair of APs the distance between which was missing in the provisional proximity matrix. A relative angle may be formed between the path and another path connecting one of the pair of APs and another AP.

At block 810, the computing device may revise the filled distance in the complete proximity matrix based on the relative angles to generate a corrected proximity matrix. The revision of the filled distances includes updating the complete proximity matrix with revised values of the filled distances. The resulting matrix formed after revising all the filled distances is referred to as the corrected proximity matrix.

At block 812, the computing device may generate a complete deployment location map for the plurality of APs based on the corrected proximity matrix. In an example, the computing device may solve the complete proximity matrix using MDS. The corrected proximity matrix may be provided as an input to MDS to generate the complete deployment location map. MDS may generate a map of location of APs based on pairwise distance of the APs in the corrected proximity matrix.

Figure 9A:
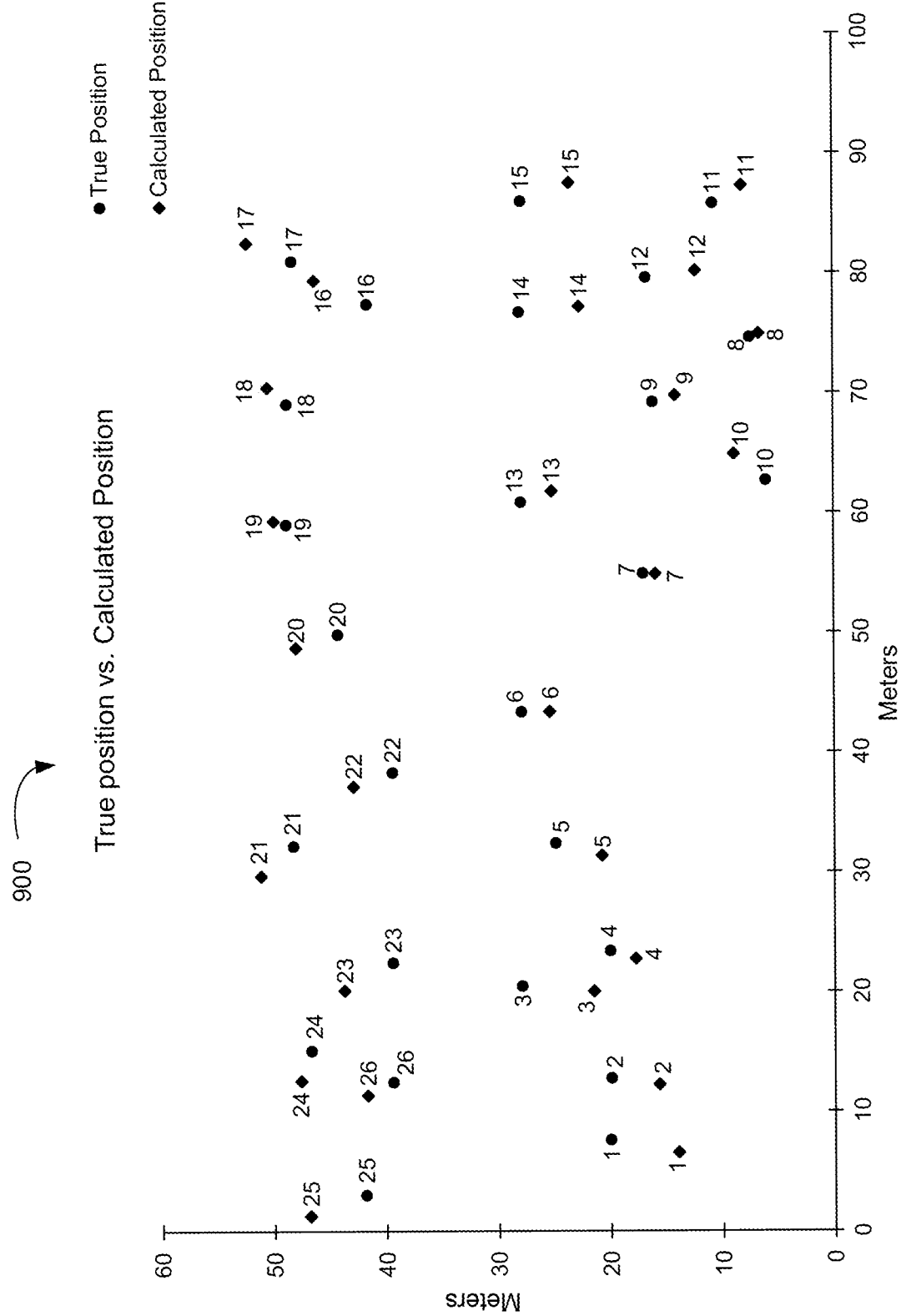
FIGS. 9A to 9D illustrate data collected by implementing the systems and methods of the present invention in a facility with multiple APs.

As explained earlier, the systems and methods of the present invention may be scaled to a facility with large number of APs. FIGS. 9A to 9D illustrate data collected by implementing the systems and methods of the present invention in such a facility with multiple APs. FIG. 9A illustrates a provisional deployment location map 900, also referred to as a provisional AP map 900, indicating locations of APs in a facility generated according to an embodiment of the present invention. The provisional AP map 900 is similar to the provisional deployment location map 400 of FIG. 4 and may be generated by a computing device, such as the computing device 150, by solving (i.e., by applying MDS on) a complete proximity matrix similar to the complete proximity matrix 304 shown in FIG. 3C. The numerals in the AP map 900 denote the APs in the facility, such as dot 1/diamond 1 corresponds to AP1, dot 2/diamond 2 corresponds to AP2, and so on. As can be seen from the provisional AP map 900 there are 26 APs in the facility which are located in the provisional AP map 900. In the provisional AP map 900 the true position of each AP is denoted by a dot and the calculated position of each AP is denoted by a diamond symbol. The calculated position of each AP may be obtained by using the method and systems of the present invention described herein. In some examples, the black dots corresponding to the true positions may be absent in a provisional deployment location map generated based on the methods and systems described herein. However, the provisional AP map 900 shows the true positions of the APs to provide a point of comparison.

Figure 9B:
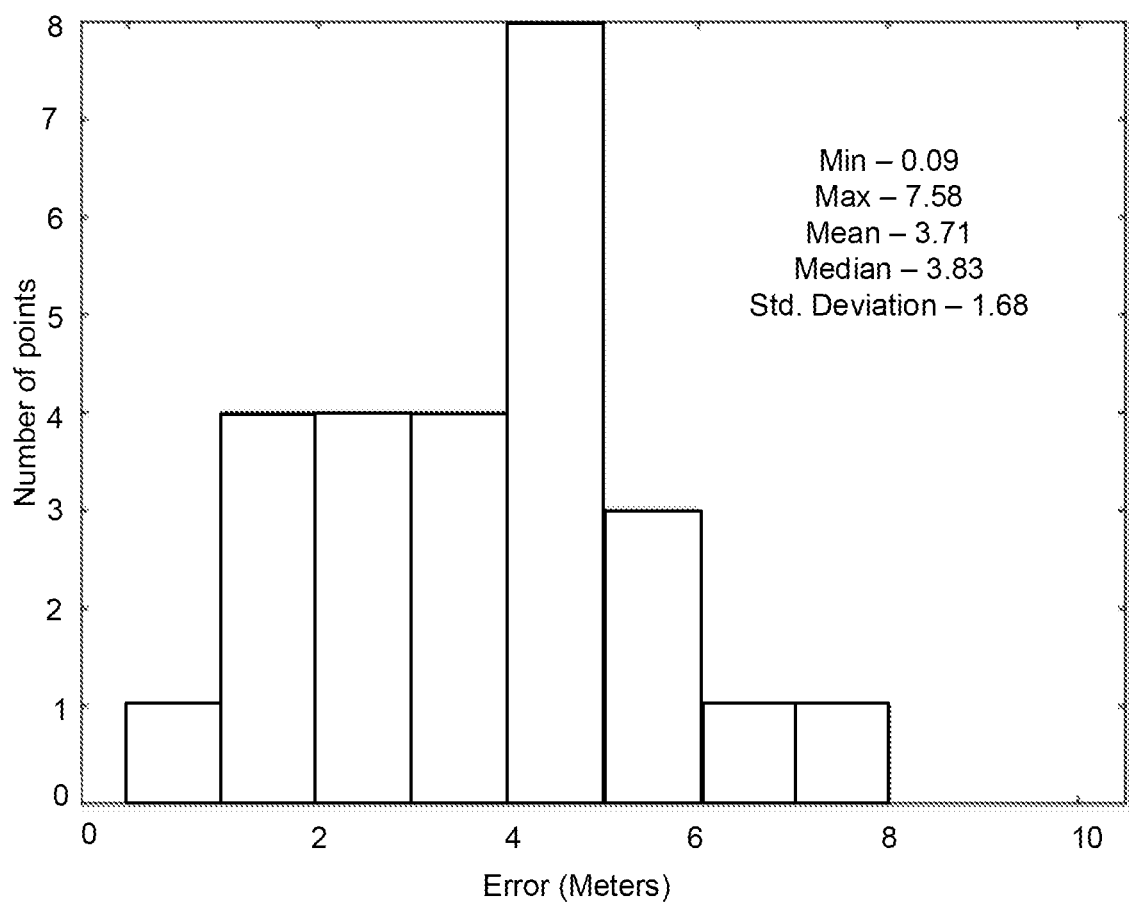

FIG. 9B shows a bar graph 902 plotting error distribution of location of the APs marked in the provisional AP map 900. Thus, a difference between the calculated position and true position of the APs in the provisional AP map 900 is plotted in the bar graph 902. As can be seen from the bar graph 902, a minimum value of error is 0.9 meters and a maximum value of error is 7.58 meters. The mean error is 3.71 meters, median error is 3.83 meters, and the standard deviation is 1.68.

Figure 9C:
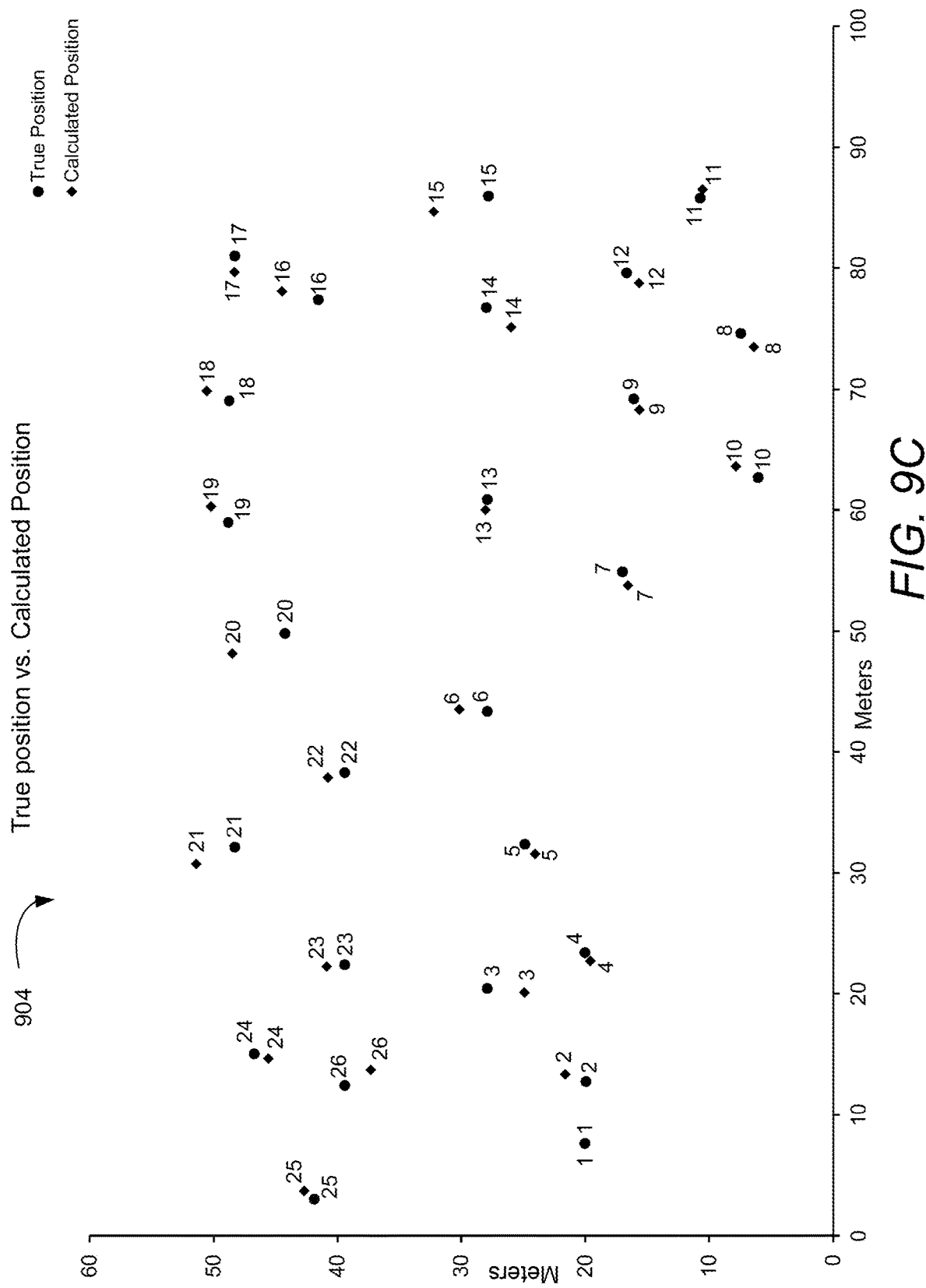

FIG. 9C illustrates a complete deployment location map 904, also referred to as complete AP map 904, indicating locations of APs in a facility generated according to an embodiment of the present invention. The complete AP map 904 is similar to the complete deployment location map 700 of FIG. 7 and may be generated by a computing system, such as the computing system 150, by solving (i.e., by applying MDS on) a corrected proximity matrix similar to the corrected proximity matrix 600 shown in FIG. 6. The numerals in the complete AP map 904 denote the APs in the facility, such as dot 1/diamond 1 corresponds to AP 1, dot 2/diamond 2 corresponds to AP 2, and so on. In the complete AP map 904 the true position of each AP is denoted by a dot and the calculated position of each AP is denoted by a diamond symbol. The calculated position of each AP may be obtained by using the methods and systems of the present invention described herein. In some examples, the dots corresponding to the true positions may be absent in a complete deployment location map generated based on the methods and systems described herein. However, the complete AP map 904 shows the true positions of the APs to provide a point of comparison.

Figure 9D:
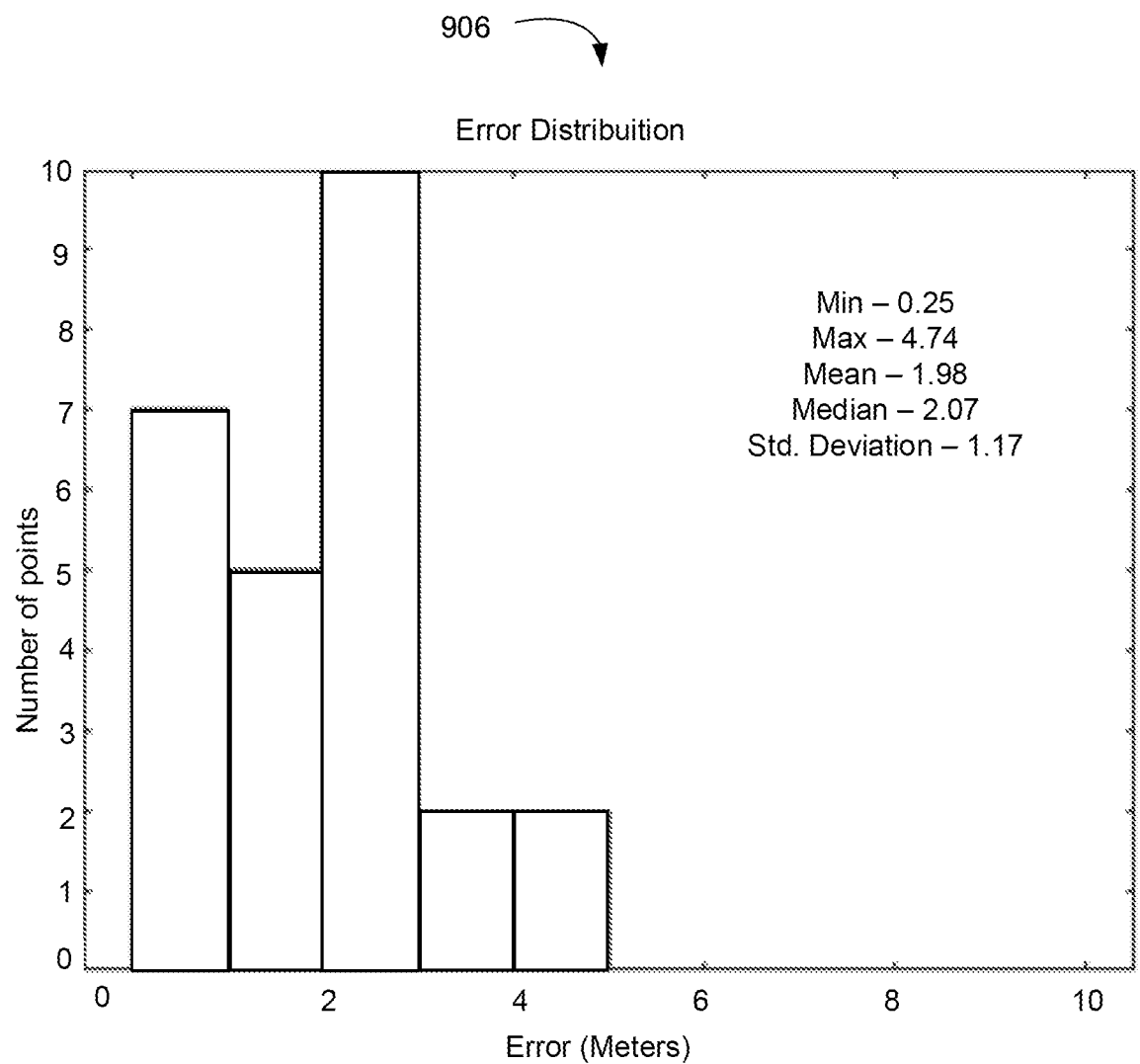

FIG. 9D shows a bar graph 906 plotting error distribution of location of the APs marked in the complete AP map 904. Thus, a difference between the calculated position and true position of the APs in the complete AP map 904 is plotted in the bar graph 906. As can be seen from the bar graph 906, a minimum value of error is 0.25 meters and a maximum value of error is 4.74 meters. The mean error is 1.98 meters, median error is 2.07 meters, and the standard deviation is 1.17.

As can be seen from a comparison of the bar graph 902 with the bar graph 906, the maximum and minimum error in AP location in the complete AP map 904 is lesser than the maximum and minimum error in AP location in the provisional AP map 900. Also, the mean error in AP location in the complete AP map 904 is much lower than the mean error in AP location in the provisional AP map 900. Thus, on revising the filled distance values and generating the complete deployment location map based on the corrected AP location map, in this example, the mean error in AP location may be reduced by about 1.5 meters and the maximum error in AP location may be reduced by about 3 meters. Thus, the complete AP map 904 provides more precise AP locations as compared to the provisional AP map 900.

Figure 10:
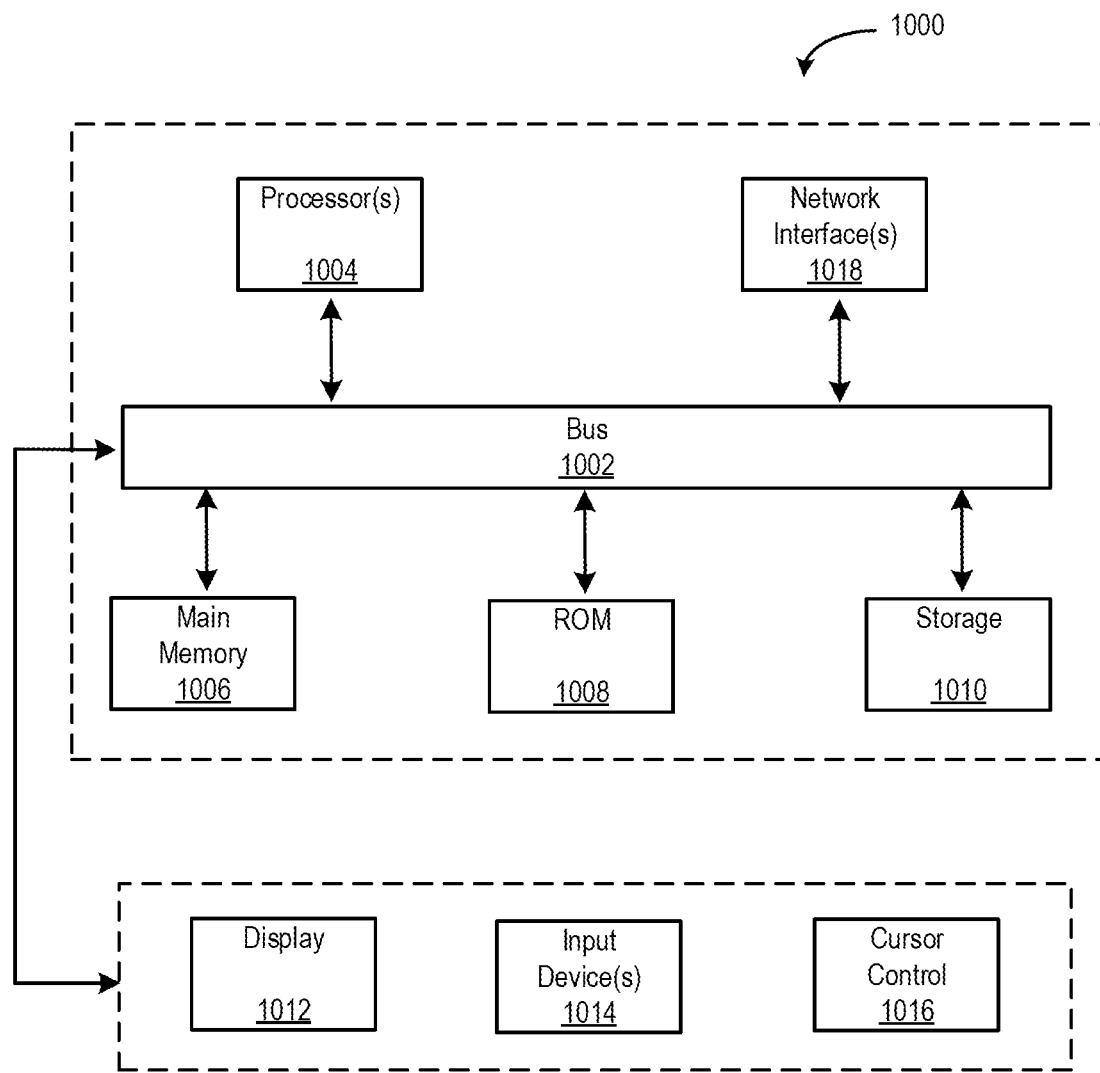
FIG. 10 depicts a block diagram of an example computer system in which the embodiments described herein may be implemented.

FIG. 10 depicts a block diagram of an example computer system 1000 in which the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network (s), network link and communication interface 918. In the Internet example, a server might transmit a requested code for an application program through the Internet, the ISP, the local network and the communication interface 1018. The received code may be executed by processor 904 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process steps may be omitted in some implementations. The methods and processes described herein are also not limited to any particular sequence, and the steps or states relating thereto can be performed in other sequences that are appropriate, or may be performed in parallel, or in some other manner. Steps or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1000.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present invention have been described in language specific to structural features and/or methods, it is to be noted that the present invention is not necessarily limited to the specific features or methods described. Rather, the specific features and methods are disclosed and explained in the context of a few implementations for the present invention.

The invention claimed is:

1. A method comprising:
   generating a provisional proximity matrix comprising a measured distance between each pair of Access Points (APs) of a plurality of APs deployed in a facility;
   filling in a missing distance between a pair of APs in the provisional proximity matrix to generate a complete proximity matrix by estimating the missing distance based on a shortest alternative path between the pair of APs;
   generating a provisional deployment location map for the plurality of APs based on the complete proximity matrix;
   determining relative angles between paths connecting the pair of APs and another AP from the plurality in the provisional deployment location map;
   revising the filled distance in the complete proximity matrix based on the relative angles to generate a corrected proximity matrix; and
   generating a complete deployment location map of the facility for the plurality of APs based on the corrected proximity matrix.

2. The method of claim 1, further comprising identifying location of a failed AP from the plurality of APs using the complete deployment location map.

3. The method of claim 1, wherein determining the relative angles comprises:
   calculating a first relative angle between a first path connecting the pair of APs in the provisional deployment location map and a second path connecting one of the pair of APs with the other AP; and
   calculating a second relative angle between the first path and a third path connecting one of the pair of APs with the other AP.

4. The method of claim 3, wherein revising the filled distance comprises:
  outlining a geometric shape by connecting the pair of APs in the provisional deployment location map with the other AP, wherein the first path forms a side of the geometric shape;
  estimating a distance between the pair of APs based on the first relative angle and the second relative angle.

5. The method of claim 1, wherein determination of the measured distance between each pair of APs includes measurement of time of flight of signals transmitted between each pair of APs.

6. The method of claim 5, wherein the determination of the measured distance between each pair of APs includes performance of fine timing measurement (FTM) by the plurality of APs.

7. The method of claim 1, wherein generating the provisional deployment location map includes executing Multi-dimensional Scaling (MDS) on the complete proximity matrix as input.

8. The method of claim 1, wherein generating the complete deployment location map includes executing Multidimensional Scaling (MDS) on the corrected proximity matrix as input.

9. The method of claim 1, further comprising orienting a generated set of locations for the plurality of APs in the provisional deployment location map based on known location of a set of anchor points in the plurality of APs.

10. The method of claim 1, wherein the map of the plurality of access points is a two-dimensional (2D) map.

11. The method of claim 1, wherein the plurality of APs is deployed on a single floor of a building.

12. A computing system comprising:
  a processor; and
  a memory coupled to the processor, the memory storing instructions executable by the processor to:
    generate a provisional proximity matrix comprising a measured distance between each pair of Access Points (APs) of a plurality of APs deployed in a facility;
    fill in a missing distance between a pair of APs in the provisional proximity matrix to generate a complete proximity matrix by estimating the missing distance based on a shortest alternative path between the pair of APs;
    generate a provisional deployment location map for the plurality of APs based on the complete proximity matrix;
    determine relative angles between paths connecting the pair of APs and another AP from the plurality in the provisional deployment location map;
    revise the filled distance in the complete proximity matrix based on the relative angles to generate a corrected proximity matrix; and
    generate a complete deployment location map of the facility for the plurality of APs based on the corrected proximity matrix.

13. The computing system of claim 12, wherein the processor is further to identify location of a failed AP from the plurality of APs using the complete deployment location map.

14. The computing system of claim 12, wherein to determine the relative angles the processor is to:
  calculate a first relative angle between a first path connecting the pair of APs in the provisional deployment location map and a second path connecting one of the pair of APs with the other AP; and
  calculate a second relative angle between the first path and a third path connecting one of the pair of APs with the other AP.

15. The computing system of claim 14, wherein to revise the filled distance the processor is to:
  outline a geometric shape by connecting the pair of APs in the provisional deployment location map with the other AP, wherein the first path forms a side of the geometric shape; and
  estimate a distance between the pair of APs based on the first relative angle and the second relative angle.

16. A non-transitory, computer readable medium including instructions that, when executed by a processor, cause a computing device to:
  generate a provisional proximity matrix comprising a measured distance between each pair of Access Points (APs) of a plurality of APs deployed in a facility;
  fill in a missing distance between a pair of APs in the provisional proximity matrix to generate a complete proximity matrix by estimating the missing distance based on a shortest alternative path between the pair of APs;
  generate a provisional deployment location map for the plurality of APs based on the complete proximity matrix;
  determine relative angles between paths connecting the pair of APs and another AP from the plurality in the provisional deployment location map;
  revise the filled distance in the complete proximity matrix based on the relative angles to generate a corrected proximity matrix; and
  generate a complete deployment location map of the facility for the plurality of APs based on the corrected proximity matrix.

17. The non-transitory, computer readable medium of claim 16, wherein the instructions when executed by the processor, cause the computing device to identify location of a failed AP from the plurality of APs using the complete deployment location map.

18. The method of claim 1, wherein the execution of MDS on the complete proximity matrix as input comprises translating information regarding pairwise distances among the plurality of APs in the complete proximity matrix into a configuration of the plurality of APs mapped into Cartesian space, the configuration comprising the provisional deployment location map.

19. The method of claim 12, wherein the instructions executable by the processor to generate the provisional deployment location map for the plurality of APs based on the complete proximity matrix comprises instructions executable by the processor to translate information regarding pairwise distances among the plurality of APs into a configuration of the plurality of APs mapped in the complete proximity matrix into a Cartesian space, the configuration comprising the provisional deployment location map.

20. The non-transitory, computer readable medium of claim 16, wherein the instructions when executed by the processor, translate information regarding pairwise distances among the plurality of APs in the complete proximity matrix into a configuration of the plurality of APs mapped into a Cartesian space, the configuration comprising the provisional deployment location map.

* * * * *